July 19, 1966  H. KOTT  3,261,973
FLASHLIGHT WITH RECHARGEABLE BATTERIES
Filed March 23, 1964
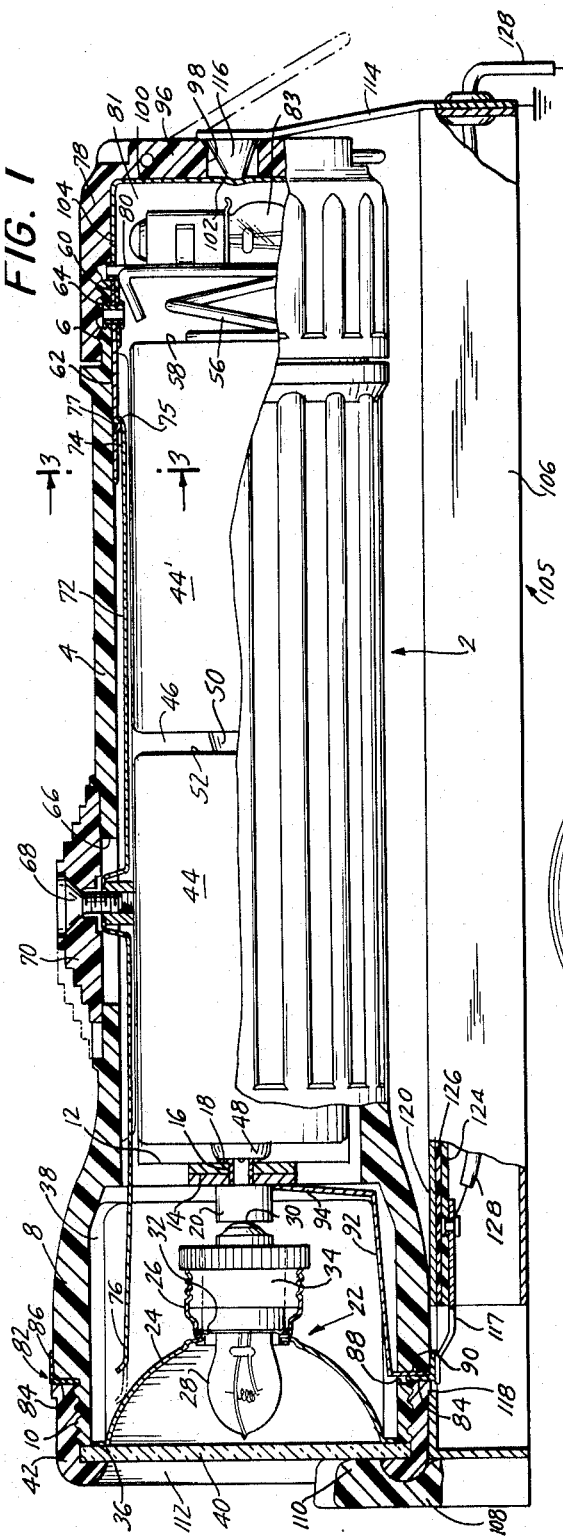
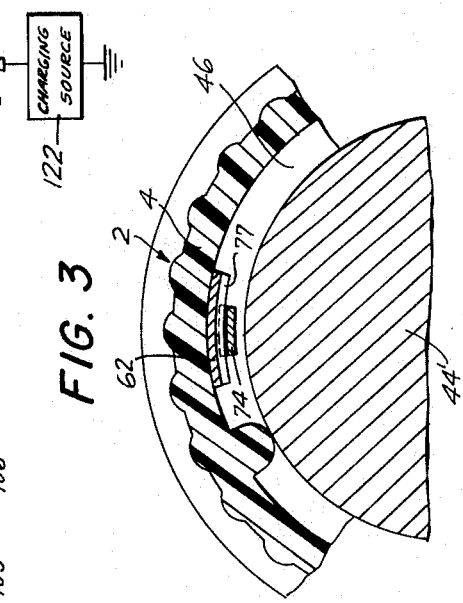
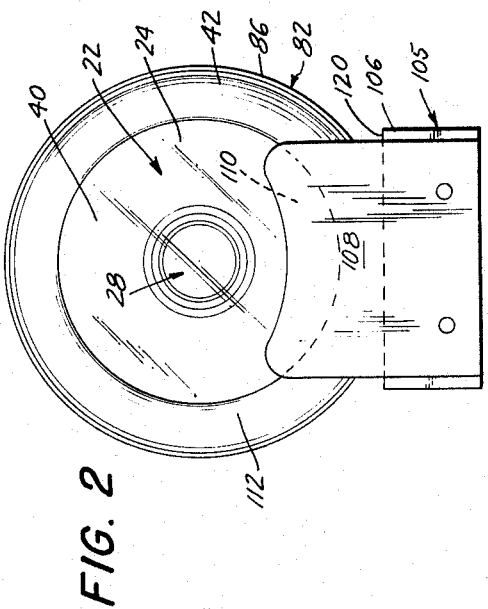
INVENTOR.
HERBERT KOTT
BY
ATTORNEYS

United States Patent Office 3,261,973
Patented July 19, 1966

3,261,973
FLASHLIGHT WITH RECHARGEABLE BATTERIES
Herbert Kott, River Edge, N.J., assignor to Bright Star Industries, Inc., Clifton, N.J., a corporation of Delaware
Filed Mar. 23, 1964, Ser. No. 353,974
2 Claims. (Cl. 240—10.66)

The present invention relates to a flashlight with which rechargeable batteries are adapted to be used, and to a bracket for holding the flashlight and making electrical connections therewith for recharging purposes.

The use of rechargeable batteries in flashlights is not new, although the recent development of certain small types of rechargeable battery cells has given impetus to such use. One of the main advantages of the use of rechargeable batteries in flashlights is the long life and reliability of the assembly, but human nature and the inherent characteristics of the rechargeable batteries combine to produce a significant factor of potential unreliability. Ordinary dry cells, when they approach the end of their effective life, give evidence thereof by producing a weakened illumination of the flashlight bulb, and thus warn the user that new dry cells should be used. Modern rechargeable cells tend not to give this warning; they either provide substantially full illumination or no illumination at all. Hence a person may one day use a rechargeable battery flashlight to good effect, and the next day the flashlight may not work at all. This is always a source of annoyance, and is sometimes a very serious matter, as where the flashlight is needed for emergency use. Since usually the batteries must be removed from the flashlight to be charged, a matter of some inconvenience, the user of the assembly will tend not to recharge the batteries until it seems that they need it, and that delay is often very serious.

In order to minimize or eliminate this drawback, various flashlight structures have been proposed in the past to permit the batteries thereof to be recharged without having to be removed from the flashlight assembly. In some instances this has involved the mounting of the flashlight on a bracket to which a suitable source of charging current is electrically connected. Arrangements of this type are subject to two apparently antithetical operational factors—the placing of the flashlight on the bracket, and retention of the flashlight on the bracket in proper electrical communication with the external charging source, should be accomplished in a simple and, hopefully, foolproof manner, and at the same time the charging electrical connections to the batteries must be so constructed and arranged as to prevent any external short-circuit across the batteries which would lead to their rapid discharge. So far as is known, these two considerations have, in the past, not been satisfactorily reconciled. Either the flashlight must be mounted in the bracket in a complicated manner or in a specific orientation in order to make charging connections to the batteries, or the external charging circuit terminals on the flashlight permit accidental short-circuiting of the batteries.

It is a prime object of the present invention to devise a flashlight construction which satisfactorily and effectively reconciles these two apparently conflicting considerations. More specifically, the flashlight is so constructed as to make it virtually impossible to provide a short-circuit across the batteries, while at the same time the placing of the flashlight in an appropriately constructed mounting bracket will effectuate electrical connection between the internal rechargeable batteries and the external source of charging current for any rotative orientation of the flashlight on the bracket. Moreover, the construction is such as to permit the use of a flashlight formed of essentially conventional parts and having a conventional appearance, the charging structure adding to the ornamental appearance of the flashlight rather than detracting therefrom.

A further object of the present invention is to provide a bracket for use in conjunction with a rechargeable battery flashlight, which bracket will permit ready attachment and detachment of the flashlight, will retain the flashlight in a readily accessible position, and will reliably effect electrical connection of the external charging source to the batteries inside the flashlight.

These results are achieved by providing, on the exterior of the flashlight, two terminal elements which are electrically connected to the batteries within the flashlight. A first of these elements is in the form of a ring which extends substantially completely about the periphery of the flashlight. The second of these elements is disposed on a different surface of the flashlight from the first terminal element, desirably at an end surface of the flashlight, and is preferably exposed at that surface through a recess in an insulating wall. Because of the location of these terminals it is virtually impossible to set up an accidental short circuit between them when the flashlight is in use.

The bracket with which the flashlight is to be used comprises spaced members which resiliently engage the flashlight so as to releasably retain the flashlight on the bracket, one of those members engaging the second charging terminal and being electrically connected to one side of the source of charging current. The other side of the charging current source is electrically connected to a contact on the bracket which is adapted to engage the ring which defines the first charging terminal. Since that ring extends substantially completely around the periphery of the flashlight, since the second charging terminal is also so located as to have electrical connection made therewith no matter what the rotative position of the flashlight relative to the bracket, and since physical mounting of the flashlight on the bracket inherently accomplishes electrical connection to the batteries, no special care need be exerted in placing the flashlight on the bracket. Once it is physically held in position thereof, the charging circuit will be completed no matter what the rotative position of the flashlight relative to the bracket may be.

To the accomplishment of the above, and to such other objects as may hereinafter appear, the present invention relates to the construction of a flashlight adapted to contain rechargeable batteries, and to a mounting bracket adapted to be used in conjunction therewith, as defined in the appended claims and as described in this specification, taken together with the accompanying drawings, in which:

FIG. 1 is a side elevational view, partially broken away and cross sectioned, showing the flashlight of the present invention mounted on the bracket of the present invention;

FIG. 2 is an end elevational view taken from the left hand end of FIG. 1; and

FIG. 3 is a fragmentary cross sectional view taken along the line 3—3 of FIG. 1.

The flashlight comprises a tubular casing generally designated 2 which may be formed of any suitable insulating material, that casing having a main body portion 4 terminating at its rear end in an externally threaded portion 6 and having at its front end an enlarged head portion 8 terminating in an externally threaded portion 10. A wall 12 divides the head portion 8 from the main body portion 4, an insert 14 being mounted in the wall 12 through which a conductive eyelet 16 extends, that eyelet having a terminal flange 18 exposed within the main body portion 4 and a terminal part 20 exposed within the head portion 8. A conductive reflector assembly generally designated 22 is received within the head portion 8 and comprises a reflecting shell 24 and a threaded rearwardly extending portion 26. A bulb assembly 28 is provided with a tip terminal 30 and a side terminal defined by a flange 32, the flange resting against the end of the reflecting shell 24 and being held in that position by insulating adapter 34 which is screwed into the rearwardly extending portion 26, the tip terminal 30 of the bulb assembly extending to the right beyond the adapter 34. The reflecting shell 24 is provided with a flange 36 at its forward end which is held against the ends of ribs 38 inside the head portion 8 by means of glass cover 40 and front end closure ring 42, the latter being screwed onto the portion 10 of the casing 2. In this position the tip terminal 30 of the bulb assembly 28 is engaged with the terminal button 20.

Batteries 44 and 44', which may be of the rechargeable type, are received within the chamber 46 defined by the interior of the casing body portion 4, with the anode 48 of the battery 44 engaging the eyelet flange 18 and with the anode 50 of the next battery 44' engaging the cathode 52 of the first battery 44. A spring 56 engages the cathode 58 of the second battery 44' and also engages conductive ring 60 on the interior of the casing portion 6, that ring being secured physically and electrically to longitudinally extending conductive strip 62 by means of eyelet 64. The eyelet flange 18 and the spring 56 constitute terminal means adapted to engage and make electrical connection with said batteries 44 and 44'. The main body portion 4 is provided with an elongated slot 66 through which screw 68 extends, the outer end of the screw 68 being connected to the control button 70 mounted on the exterior of the casing section 4, and the inner end of the screw being connected to elongated conductive strip 72 the right hand 74 of which engages and slides over the conductive strip 62 and the left hand end 76 of which is movable into and out of engagement with the conductive reflecting shell 24. The right hand strip end 74 may be provided with curved tip 75 receivable in snap fashion over protrusion 77 on strip 62. The control button 70 and the strip 72 are shown in solid lines in FIG. 1 in their right hand position out of engagement with the shell 24 and are shown in broken lines in their left hand position where engagement is made with the shell 24. When such engagement is made a circuit is completed through the lamp 28 and the batteries 44 and 44', causing the lamp to light. When disengagement is effected between the strip end 76 and the shell 24, that circuit is opened and the lamp goes out. An end cap 78 is screwed onto the casing portion 6 and carries a wall 80 which engages and compresses the spring 56, thus pressing the batteries 44 against one another and against the terminal flange 18. A chamber 81 may be formed between the wall 80 and the end wall 96 of the end cap 68, within which chamber a spare bulb 83 may be stored.

The flashlight construction as thus far described is essentially conventional, and emphasizes that the flashlight of the instant design may be made in large part of conventionally constructed components and has a conventional appearance. Moreover, it can be used with batteries 44 of the conventional dry cell type if desired, or if rechargeable batteries are not available.

A conductive ring generally designated 82 is mounted on the exterior of the head portion 8. It has a radially extending wall 84 held in place between the head portion 8 and the closure ring 42, and a peripheral wall 86 exposed at the exterior of the head portion 8 and extending substantially completely therearound. The head portion 8 is provided with a slot 88 through which conductive arm 90 is adapted to extend from inside the head portion 8 into engagement with the ring wall 84, that arm 90 extending inside the head portion 8, via conductive parts 92 and 94, into physical and electrical connection with the conductive eyelet 16. The wall 86 of the ring 82 constitutes a first charging terminal for rechargeable batteries 44 and 44', making electrical connection with the anode 48 of the first battery 44 via parts 84, 90, 92, 94, 16 and 18.

The end cap 78 has an end wall 96 formed of insulating material and of appreciable thickness, that end wall having an opening 98 located substantially on the longitudinal axis of the flashlight. A conductive strip 100 is mounted on the inner surface of the wall 96, and a portion of that strip, designated 102, is exposed at the aperture 98. The strip 100 is provided with a conductive extension 104 which is electrically connected to the ring 60 in any appropriate manner, as by being fixed to conductive wall 80 which in turn engages ring 60. The portion 102 of the strip 100 defines the second charging terminal for the rechargeable batteries 44 and 44', being electrically connected to the cathode 58 of the right hand battery 44' via parts 104, 80, 60 and 56.

The bracket, generally designated 105, on which the flashlight is adapted to be mounted, and by means of which electrical connection is adapted to be made to the rechargeable batteries 44 and 44', comprises an elongated base 106 having an arm 108 secured at one end thereof and extending up therefrom. As here disclosed that arm is formed of any suitable plastic material and is provided with a curved inwardly facing lip 110 adapted to engage with the outwardly projecting lip 112 defined by the forward end of the flashlight closure ring 42. Mounted on the other end of the base 106 is a resilient conductive arm 114 carrying at its free end a tapered pin-like part 116 of a size such as to pass through the opening 98 in the end wall 96 of the flashlight end cap 78 and engage the conductive strip portion 102 exposed at the interior of that opening 98. The normal longitudinal spacing between the pin 116 and the lip 110 is less than the spacing between those two parts when the flashlight is in place, so that the resiliency of the arm 114 tends to retain the flashlight in the position on the bracket shown in FIG. 1. When the flashlight is to be removed from the bracket 105 it is moved to the right as viewed in FIG. 1, deflecting the arm 114, until the flashlight lip 112 escapes from the bracket lip 110, after which the flashlight is free to be disengaged from the bracket. The flashlight is secured in place on the bracket 105 by reverse movement. The bracket 105 also carries one or more spring fingers 117 which normally extend up through a slot 118 in the top wall 120 of the bracket base, the spring fingers 117 being so positioned that when the flashlight is in position on the bracket the fingers 117 will engage the peripheral wall 86 of the ring 82. One side of the external source of charging current, generally designated 122, is electrically connected in any appropriate manner to the spring fingers 117, those fingers being electrically insulated from the arm 114 by means of insulating plate 124 and insulating sheet 126, and the arm 114 is adapted to be electrically connected in any appropriate manner to the other side of the charging source 122. Purely by way of example, the connection between one side of the charging source and the spring fingers 116 may be by means of wire lead 128, and the electrical connection between the arm 114 and the other side of the charging source 122 may be accomplished by connecting both of them to a common ground.

When the flashlight is in position on the bracket the pin 116 carried by the arm 114 performs a dual function. It serves, in conjunction with the arm 108 and the lip 110 thereon, to physically retain the flashlight in position on the bracket 105 and to prevent its removal therefrom until the flashlight has first been moved in the direction of its longitudinal axis so as to disengage lip 112 from lip 110. The pin 116 also, coincidentally with its physical retention function, makes electrical connection with the flashlight charging terminal 102, and thus with one electrical end of the rechargeable batteries 44 and 44'. Because the pin 116 is located substantially on the longitudinal axis of the flashlight, this electrical connection will be accomplished no matter what the rotative position of the flashlight may be relative to the bracket. When the flashligth is on the bracket electrical connection to the other side of the rechargeable batteries 44 and 44' is accomplished by engagement between the spring contacts 117 on the bracket 106 and the ring 82 on the flashlight. Because the ring 82 extends substantially completely around the periphery of the flashlight, this electrical connection also will be accomplished no matter what the relative rotative position of the flashlight relative to the bracket may be. When the flashlight is removed from the bracket the charging terminal defined by the ring 82 is exposed at the side of the flashlight body, but the other charging terminal 102 is located at the end of the flashlight, and preferably is recessed at that end. Hence it is virtually impossible to accidentally electrically short-circuit the batteries 44 and 44' by electrically connecting the charging terminals 82 and 102. The removal of the flashlight from the bracket opens the circuit to the charging source 122, so that said source will not be depleted while the flashlight is being used. Attachment of the flashlight to the bracket automatically and reliably ensures that its rechargeable batteries 44 are electrically connected to the charging source 122 so that they can be charged thereby.

The exposure of the wall 86 of the ring 82 around the head portion 8 of the flashlight casing adds an element of visual contrast which enhances the attractiveness of the flashlight without in any way revealing its function as a charging terminal. The fact that it can be accepted by the purchaser purely as an ornamental feature adds to the security of use of the flashlight, since experimental tampering with the ring 82 is not encouraged.

As has been seen, the flashlight is composed of elements which in the main can be standard flashlight components. Thus it can be manufactured at low cost, largely using tools and dies already available for the manufacture of conventional dry cell battery flashlights. The additional components used to provide for charging of the batteries are simple and inexpensive, and their presence does not preclude the use of the flashlight with conventional dry cell batteries.

While only a single embodiment of the present invention has been here specifically disclosed, it will be apparent that many variations may be made therein, all within the scope of the invention as defined in the following claims.

I claim:
1. In a rechargeable battery flashlight-holder combination, said flashlight comprising a casing comprising a front portion carrying a bulb, a rear portion, and an intermediate portion having a battery-receiving chamber, and means for producing an electrical circuit through said bulb and the batteries adapted to be received in said chamber; the improvement which comprises first and second terminal means opening into said chamber adjacent front and rear ends thereof respectively and adapted to make electrical connection with rechargeable batteries in said chamber independently of said bulb, a conductive strip on said front portion and accessible at the exterior of said portion substantially completely therearound, means electrically connecting said strip and said first terminal means, a conductive element on and accessible at the exterior of the end of said rear portion, and means electrically connecting said conductive element and said second terminal means, said front portion of said flashlight casing being provided with an axially facing lip, said bracket being adapted to receive said flashlight and comprising a base, first and second arms extending up from opposite ends of said base, at least one of said arms being resilient, said first arm having a lip extending toward said second arm and removably engaging said lip on said flashlight, said second arm having a pin extending toward said first arm and removably engaging and making contact with said conductive element at the exterior of the end of said rear portion of said casing, a spring contact on said base removably engaging said strip on the exterior of said flashlight, and electrical connections to said spring contact and said pin, whereby said contact and pin function as terminals making electrical connection with rechargeable batteries in said flashlight and said lip and pin function to retain said flashlight in position on said bracket.

2. In a rechargeable battery flashlight-holder combination, said flashlight comprising a casing comprising a front portion carrying a bulb, a rear portion having an insulating member with a recessed part accessible at the end of said rear portion thereof, and an intermediate portion having a battery-receiving chamber, and means for producing an electrical circuit through said bulb and the batteries adapted to be received in said chamber; the improvement which comprises first and second terminal means opening into said chamber adjacent front and rear ends thereof respectively and adapted to make electrical connection with rechargeable batteries in said chamber independently of said bulb, a conductive strip on said front portion and accessible at the exterior of said portion substantially completely therearound, means electrically connecting said strip and said first terminal means, a conductive element on and accessible at said recessed part of said insulating member, and means electrically connecting said conductive element and said second terminal means, said front portion of said flashlight casing being provided with an axially facing lip, said bracket being adapted to receive said flashlight and comprising a base, first and second arms extending up from opposite ends of said base, at least one of said arms being resilient, said first arm having a lip extending toward said second arm and removably engaging said lip on said flashlight, said second arm having a pin extending toward said first arm and removably engaging in said recessed part of said insulating member on said flashlight and making contact with said conductive element, a spring contact on said base between said arms and removably engaging said strip on the exterior of said flashlight, and electrical connections to said spring contact and said pin, whereby said contact and pin function as terminals making electrical connection with rechargeable batteries in said flashlight and said lip and pin function to retain said flashlight in positon on said bracket.

References Cited by the Examiner

UNITED STATES PATENTS

| | | | |
|---|---|---|---|
| 2,293,284 | 8/1942 | Emanuel | 240—10.6 |
| 2,413,484 | 12/1946 | Berger | 240—10.66 X |
| 2,666,894 | 1/1954 | Babernitsh | 240—10.66 X |
| 3,107,028 | 10/1963 | De Robertis | 220—60 |
| 3,143,697 | 8/1964 | Springer | 320—2 |
| 3,217,224 | 11/1965 | Sherwood | 240—10.6 |

FOREIGN PATENTS 629,737  9/1949  Great Britain.

NORTON ANSHER, *Primary Examiner.*

J. F. PETERS, *Assistant Examiner.*